UNITED STATES PATENT OFFICE.

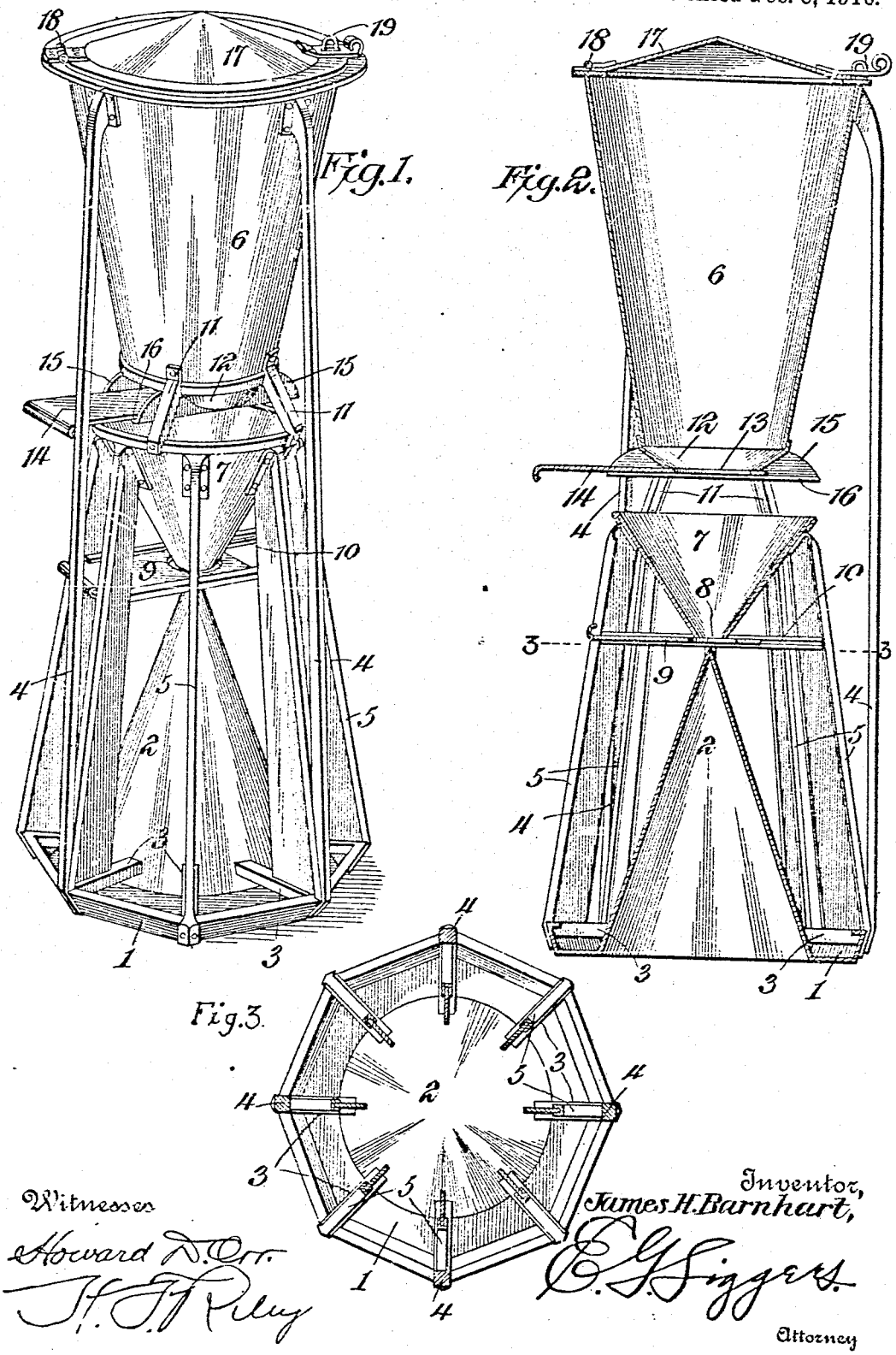

JAMES H. BARNHART, OF EGELAND, NORTH DAKOTA.

HOG-TROUGH.

948,839.

Specification of Letters Patent.

Patented Feb. 8, 1910.

Application filed September 12, 1908. Serial No. 452,727.

*To all whom it may concern:*

Be it known that I, JAMES H. BARNHART, a citizen of the United States, residing at Egeland, in the county of Towner and State of North Dakota, have invented a new and useful Hog-Trough, of which the following is a specification.

The invention relates to improvements in hog troughs.

The object of the present invention is to improve the construction of hog troughs, and to provide a simple and inexpensive hog trough of great strength and durability, designed for both the feeding and watering of hogs and other animals, and capable of effectually preventing hogs from getting into it and rooting out and wasting the grain or soiling or fouling the feed, whereby the trough is maintained in a clean condition and the stock economically fed.

The invention also has for its object to enable hogs to be conveniently fed, and to prevent them from interfering with the placing of the material in it, and to provide means for uniformly distributing the feed to a plurality of separate compartments, and adapted also to prevent the animals from interfering with one another.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention In the drawing:—Figure 1 is a perspective view of a hog trough, constructed in accordance with this invention. Fig. 2 is a vertical sectional view of the same. Fig. 3 is a horizontal sectional view on the line 3—3 of Fig. 2.

Like numerals of reference designate corresponding parts in all the figures of the drawing.

The hog trough, which may be constructed any size and of any suitable material, comprises in its construction an octagonal bottom trough 1 and a conical spreader 2, rising from the bottom of the trough and constituting the inner wall of the same, as clearly illustrated in Fig. 2 of the drawing. The trough surrounds the lower portion of the conical spreader and it may be of any polygonal or other shape to accommodate the desired number of animals. The trough is divided into separate compartments by horizontal braces 3 and long and short inclined braces 4 and 5. The horizontal braces extend from the outer wall of the trough at the angles thereof to the conical spreader, and the long and short inclined braces extend upward from the trough at the outer portions of the horizontal braces to an upper container 6 and an intermediate hopper 7. The braces completely separate the hogs from one another and prevent one animal from interfering with another, and they also operate to prevent the hogs from getting into tne trough and wasting or spoiling the feed material.

The hopper, which is inverted conical shape, is supported by the short inclined braces 5, and it is provided at the bottom with an opening 8, located above the apex of the conical separator and adapted to be closed or partially closed by a horizontal cut-off 9, slidable in suitable ways 10 and interposed between the bottom of the hopper and the spreader. The hopper is spaced a short distance from the apex of the spreader and the ways are formed by opposite horizontal pieces, provided with grooves. The cut-off 9 is provided with a circular opening, which is adapted to be carried to and from the opening of the bottom of the hopper by the sliding of the cut-off.

The container is supported by the long inclined braces 4 and by short inclined standards 11, secured to and extending upwardly and inwardly from the hopper and fastened at their upper ends to the container at the lower end thereof. The container, which is preferably tapered from the top to the bottom, is circular in cross section, and it has a tapering bottom 12, provided with an opening 13, adapted to be closed or partially closed by a sliding cut-off 14, mounted in suitable ways 15, consisting of belts or pieces secured to the bottom of the container and having inwardly extending horizontal flanges 16. Any other suitable means, however, may be employed for slidably mounting the cut-off. The container is also equipped with a suitable cover 17, hinged at one side at 18 and provided at a diametrically opposite point with suitable fastening means 19, preferably consisting of a hasp or staple, but any other locking device may be employed. The superimposed container or receptacle is designed for holding grain, which may be delivered into the hopper in the desired quantities, and swill or other feed material may be conveniently poured into the hopper. Also the trough is adapted to be used for watering hogs, or other animals.

Having thus fully described my invention, what I claim as new and desire to secure by Letters Patent, is:—

1. A device of the class described comprising a bottom trough, a conical spreader rising from the bottom of the trough and extending above the latter and constituting an inner wall thereof, a hopper located above and spaced from the spreader and open at the top, a container arranged above and spaced from the hopper to expose the top of the same, and long and short braces dividing the trough into separate compartments and extending from the trough to the hopper and to the container, said hopper and container being carried by the trough.

2. A device of the class described including a bottom trough, a conical spreader rising from the bottom of the trough and extending above the latter and constituting the inner wall thereof, a hopper open at the top and located above the spreader, a container located above and spaced from the hopper to expose the top thereof, short transverse braces extending across the trough at intervals from the outer wall to the spreader and dividing the said trough into separate compartments, and long and short inclined braces extending from the transverse braces to the hopper and to the container and connecting the same with the trough, said hopper and container being carried by the trough.

3. A device of the class described including a polygonal trough, a conical spreader rising from the bottom of the trough and constituting the inner wall of the same, an inverted conical hopper located above and spaced from the trough, a container arranged above the hopper, standards mounted on the hopper and secured to the lower end of the container, transverse braces extending across the trough from the outer wall thereof to the spreader, long and short braces extending upward from the transverse braces to the hopper and to the container, and means for controlling the discharge of the material from the container and from the hopper.

In testimony, that I claim the foregoing as my own, I have hereto affixed my signature in the presence of two witnesses.

JAMES H. BARNHART.

Witnesses:
O. A. DREWS,
GEO. F. ELSBERRY.